Sept. 7, 1965 J. J. LA ROCCA 3,205,019
HYDRAULICALLY OPERATED BRAKE MECHANISM
Filed June 6, 1962 2 Sheets-Sheet 1
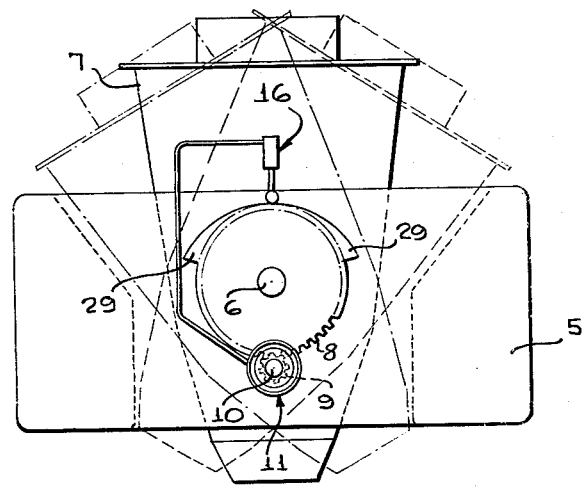
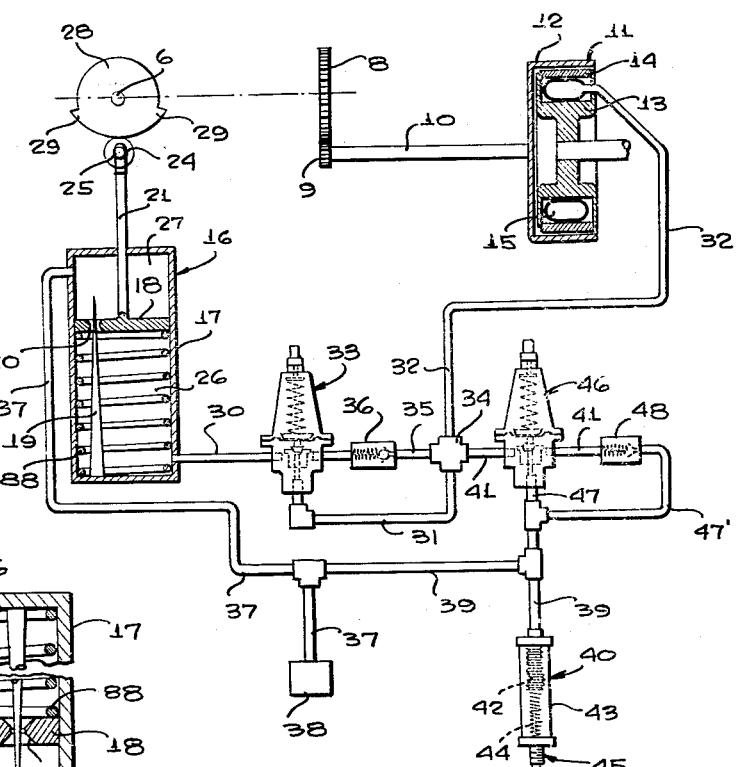
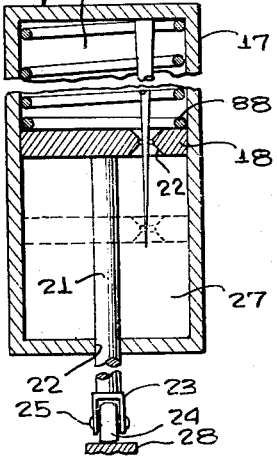
INVENTOR
JAMES J. LA ROCCA
BY Mason, Porter, Diller & Stewart
ATTORNEYS Sept. 7, 1965 J. J. LA ROCCA 3,205,019
HYDRAULICALLY OPERATED BRAKE MECHANISM
Filed June 6, 1962 2 Sheets-Sheet 2
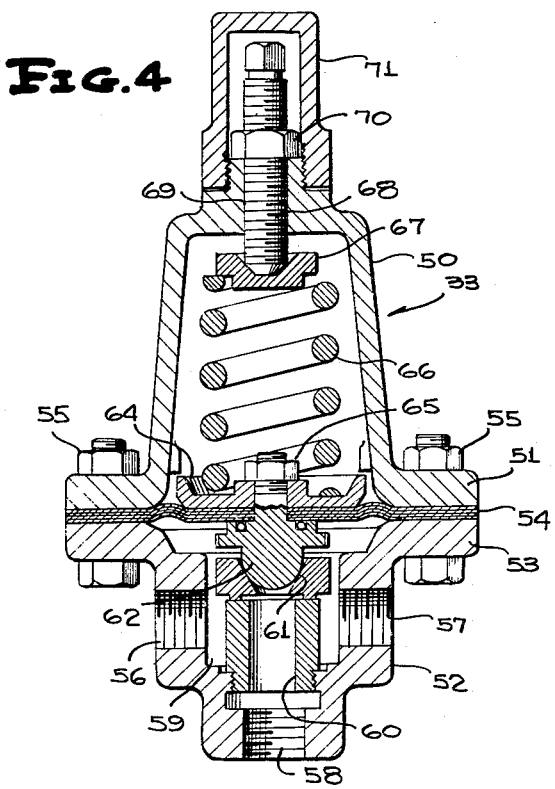
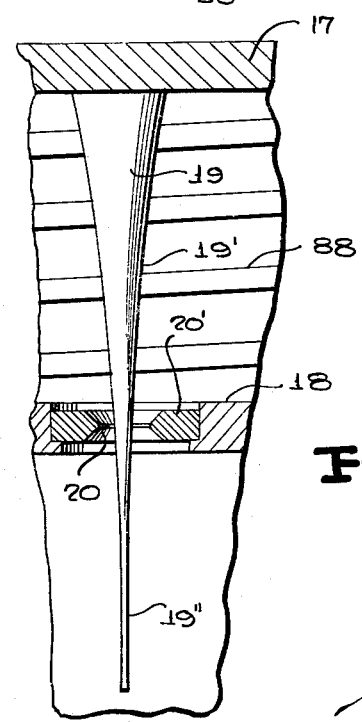
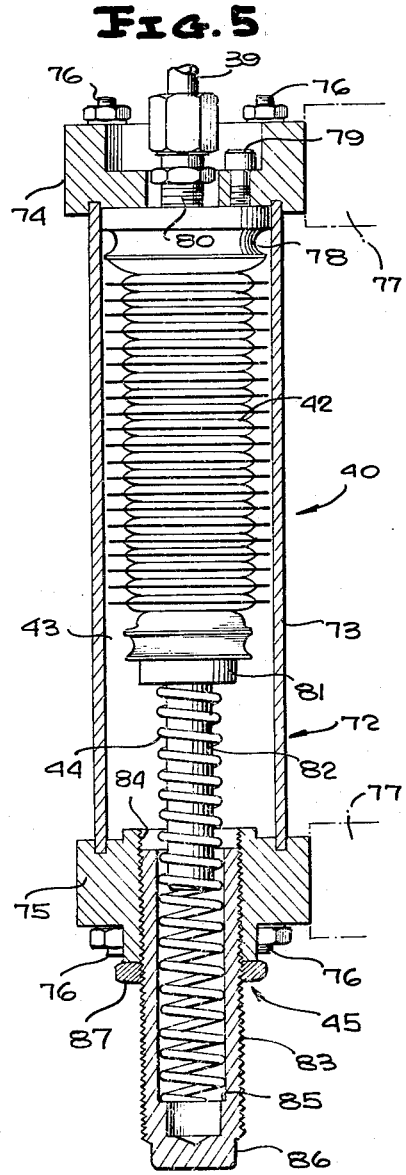
INVENTOR
JAMES J. LaROCCA
BY
Mason, Porter, Diller & Stewart
ATTORNEYS

United States Patent Office 3,205,019
Patented Sept. 7, 1965

3,205,019
HYDRAULICALLY OPERATED BRAKE
MECHANISM
James J. La Rocca, Matteson, Ill., assignor to Continental
Can Company, Inc., New York, N.Y., a corporation of
New York
Filed June 6, 1962, Ser. No. 200,447
13 Claims. (Cl. 303—21)

This invention broadly relates to a hydraulically operated brake mechanism for controlling the speed of a moving body within prescribed limits.

The invention more specifically deals with an emergency stop mechanism designed to operate upon a body movable within limits of a gimbal member so as to prevent damage to either the body or the gimbal.

Large costly systems such as those utilized at radar tracking stations normally house radio frequency equipment within a member generally designated as a R.F. housing. This housing normally weighs several thousand pounds and is mounted for movement within prescribed limits in a ring-like gimbal member. In operation, the R.F. housing is driven within the limits of its gimbal along a prescribed path and at various speeds dependent upon such factors as the scanning rate of the system. The components housed within the R.F. housing, the R.F. housing itself and the gimbal comprising such tracking systems are very costly as they are built to demanding specifications. It follows, therefore, that these and other members of the system must be protected from injury. If a primary means for controlling the movement of the R.F. housing within the limits prescribed by the gimbal fails, there is strong likelihood of a resultant collision between the R.F. housing and the gimbal, and attendant damage to the respective members will occur.

This invention deals with an emergency braking system which has been designed to prevent a chance collision between the R.F. housing and the gimbal and resultant damaging of these parts. It is, therefore, an important object of the present invention to provide a hydraulically operated braking system for controlling the speed of a body moving along a prescribed path below a predetermined speed, which at any particular position of the body as it moves along its prescribed path, might be so dangerously high as to increase the likelihood of a collision between the body and a member or members with which it is associated.

Another object of the invention is to provide an emergency hydraulically operated braking system which includes a brake adapted to retard the movement of a body which is fixedly secured to and movable with a shaft, the movement of the shaft, in turn, actuating the reciprocable piston of a pressure developer through suitable cam means so as to apply a fluid pressure to the brake and actuate the same for the purpose stated.

A further object of the invention is the provision of a braking system which includes a hydraulically operated brake, a pressure developer including a hydraulic cylinder, an orificed piston reciprocable in the cylinder and a tapered metering pin receivable through the piston orifice, suitable fluid lines connecting the brake and pressure developer, a piston rod connected to the piston and effective to move the piston relative to the cylinder upon actuation by cam means associated with the moving body to which the braking action is to be applied.

A still further object of the invention is the provision of a braking system including a hydraulically operated brake operatively associated with a shaft upon which a moving body to be retarded in motion by a braking action is fixedly secured, a pressure developer including a hydraulic cylinder, an orificed piston movable in the cylinder and a tapered metering pin receivable through the piston orifice, a piston rod connected to the piston and effective to move the piston relative to the cylinder upon actuation by cam means mounted on the shaft, a fluid accumulator having a bellows arranged to receive fluid displaced by movement of the piston in the cylinder, and fluid lines connecting the brake, the pressure developer and the fluid accumulator.

Another object of the invention is the provision of a braking system including a hydraulically operated brake operatively associated with a shaft upon which a moving body to be retarded in motion by a braking action is fixedly secured, a pressure developer including a hydraulic cylinder, an orificed piston movable in the cylinder and a tapered metering pin receivable through the piston orifice, a piston rod connected to the piston and effective to move the piston relative to the cylinder upon actuation by cam means mounted on the shaft, and a fluid accumulator having a bellows arranged to receive fluid from the system, said bellows being urged toward a collapsed fluid expelling position by an adjustable spring member, the force exerted upon the fluid system by the bellows being utilizable for adjusting the relative position of the braking elements of the brake.

Still another object of the invention is the provision of a braking system including a hydraulically operated brake operatively associated with a shaft upon which a moving body to be retarded in motion by a braking action is fixedly secured, a pressure developer including a hydraulic cylinder, an orificed piston movable in the cylinder and a tapered metering pin receivable through the piston orifice, a piston rod connected to the piston and effective to move the piston relative to the cylinder upon actuation by cam means mounted on the shaft, a fluid accumulator having a bellows arranged to receive fluid displaced by movement of the piston in the cylinder, fluid lines connecting the brake, the pressure developer and the fluid accumulator together, a sequencing pressure valve located between the pressure developer and the brake, and a safety pressure valve located between the accumulator and the brake.

With the above and other objects in view, as will hereinafter appear, the nature of the invention will be more clearly understood by reference to the following detailed description and the accompanying drawing.

FIGURE 1 is a somewhat pictorial elevational view showing the mounting of and the relationship of a housing member with its associated gimbal.

FIGURE 2 is a rotated schematic view with portions of particular pieces of the apparatus having been shown in section and with the pressure developer rearranged to an inverted position for purposes of clarity.

FIGURE 3 is an enlarged elevational sectional view of the pressure developer of the present braking system and shows two relative positions of its associated piston.

FIGURE 4 is an enlarged vertical sectional view taken through a pressure relief valve utilized in conjunction with this invention.

FIGURE 5 is an enlarged vertical sectional view taken through an accumulator utilized with this invention.

FIGURE 6 is an enlarged fragmentary vertical sectional view taken through the pressure developer, and shows the specific details of the valve construction thereof.

Referring to the drawings in detail, and more particularly to FIGURE 1 thereof, there is shown a ring-like gimbal member 5. A shaft 6 is mounted transversely of the gimbal and has each of its opposite ends journaled for rotation within opposite sides of the gimbal 5. A housing member 7 is fixedly secured to the shaft 6 and is adapted to swing within prescribed limits as shown by the phantom representation of the housing 7 in FIGURE 1 upon the rotation of the shaft 6 when the same is driven by suitable power means (not shown). A bull gear 8 is fixed to the shaft 6 for rotation therewith. The bull gear 8 meshes with a pinion gear 9 which is mounted upon a shaft 10.

A brake 11 is mounted on a suitable member of the system, such as the outside wall of the gimbal 5. The brake 11 is hydraulically operated and includes an outer shell or drum 12 which is secured to the shaft 10, and a stationary hub member 13. The brake 11 is further provided with a frictional brake pad 14 mounted in continuous relationship to its outer shell 12 and fluid expansible tube 15 which is situated radially between the brake pad 14 and the hub 13. Expander tube 15 is connected to a source of brake actuating fluid pressure as will hereinafter be explained.

A pressure developer 16 is also mounted within the system, such as upon the gimbal 5 as schematically illustrated in FIGURE 1. The pressure developer 16 includes an outer cylindrical shell 17, a piston 18 reciprocable in the shell and a slender, generally conically shaped metering pin 19. The piston 18 engages the inner portions of the cylinder 17 in fluid sealing relationship and is axially movable within the cylinder 17, as illustrated. The piston 18 is further provided with an orifice 20 which is aligned with the generally conically shaped pin 19. The generally conically shaped pin is axially presented so as to be receivable through the piston orifice 20.

It should be noted that the effective area of the orifice 20 is respectively either increased or decreased as the piston 18 moves away from or toward the enlarged base of the metering pin 19. This is best shown in FIGURE 6. Also in this figure, it is shown that the orifice 20 is defined by an insert ring 20' which is seated in the piston 18. By so defining the orifice 20, it will be seen that the orifice 20 may be accurately formed without expensive machining operations on the much larger piston 18. It is also to be noted that the generally conical metering pin 19 is not a true cone in that it has a curved outline upper portion 19' and a nearly straight lower portion 19''.

A piston rod 21 is connected to the piston 18 and is movable into and out of the cylinder 17 through a sealed hole 22 at one end thereof. The end of the rod 21 projects from the cylinder and is provided with a support 23 in which a cam follower 24 is mounted by means of the pin 25. The positioning of the piston 18 within the hydraulic cylinder 17 separates the cylinder 17 into two chambers. The first chamber 26 is designated the primary head end while the other chamber 27 is designated the secondary head end.

A cam 28 having risers 29 is fixedly secured to the shaft 6 and rotates therewith. Although the risers 29 of the cam 28 have been shown as being of equal or like configuration in the drawing, it should be pointed out that this is primarily for ease of illustrating the housing member 7 as being tiltable in equal amounts from its initial position as shown by the solid lines in FIGURE 1 and that unequal or odd cam lifts may be utilized when associated with other embodiments of the illustrated system. The pressure developer 16 is mounted on the gimbal 5 in position for being operatively associated with the cam 28. In this manner, the rotational movement of the shaft 6 actuates the cam follower 24 by means of the cam 28 so as to move the piston rod 21 and place the piston 18 in the cylinder 17 depending on the exact position of the housing 7 in relationship to the gimbal 5. It should be also noted that the speed at which the piston 18 is moved in relationship to the cylinder 17 is directly dependent upon the angular configuration of the risers 29.

A series of fluid lines 30, 31 and 32 run from the primary head end 26 of the pressure developer 16 and connect to the expander tube 15 of the brake 11 through suitable connector means (not shown). A sequencing pressure valve 33 is connected between fluid lines 30 and 31. The pressure valve 33 is of the conventional spring loaded and adjustable type and may be set at any desired pressure above which the valve 33 is caused to operate so as to permit fluid pressure from head end 26 and along the line 30 into lines 31 and 32 to actuate the expander tube 15 of the brake 11 and apply a braking action effective to reduce the speed of movement of the housing 7. A four-way block 34 is provided between lines 31 and 32. A branch line 35 connects from the block 34 to the valve 33 and has a directional check valve 36 mounted therein. The valve 33 permits free pressure transmission through the horizontal extent of its body from line 35 through check valve 36 into line 30 in FIGURE 2 of the drawing.

A line 37 is connected to the secondary head end 27 of the pressure developer 16 through suitable connector means (not shown) and runs therefrom to a pressure switch 38. Line 39 runs from the pressure switch 38 to an accumulator 40. The accumulator 40 is mainly comprised of a bellow 42 mounted in an appropriate chamber 43 and spring urged to a collapsed position by spring 44 which is adjustable by screw means 45. A pressure relief valve 46 is disposed along a line 41 and acts as a pressure relief valve for the entire system and to that purpose is adjusted to a higher pressure setting than the similarly constructed valve 33. Line 39 is communicated with the block 34 by means of line 47, pressure relief valve 46 and line 41. A branch line 47' connects one side of a check valve 48 to line 39 proximate the accumulator 40. The other side of check valve 48 is communicated with the block 34 by means of line 41 through valve 46.

Although the pressure relief valves 33 and 46 are convential valves, it is deemed advisable to illustrate the details of these valves. Since the two valves 33 and 46 are identical, only the valve 33 has been specifically illustrated, and reference is now made to FIGURE 4.

The pressure relief valve 33 includes an upper housing half 50 with a lower flange 51, and a lower housing half 52 with an upper flange 53. A diaphragm 54 is disposed between the flanges 51 and 53 and is clamped therebetween by means of a plurality of circumferentially spaced fasteners 55 of the nut and bolt type.

The lower housing half 52 is provided with a pair of transversely aligned threaded openings 56 and 57 which function as inlet openings. The lower end of the lower housing half 52 is also provided with an internally threaded opening 58 which serves as an outlet opening. All of the openings 56, 57 and 58 open into a lower chamber 59 defined by the lower housing half 52 and the diaphragm 54.

A tubular valve seat support 60 is disposed in the lower part of the housing half 52 in axial alignment with the opening 58. The valve seat support 60 carries an upper valve seat 61 which controls the transmission of fluid pressure through the valve seat support 60 and out through the opening 58. A valve member 62 is carried by the diaphragm 54 for engagement with the valve seat 61. The valve member 62 is supported by a pin 63 which passes through the diaphragm 54 and is sealed relative thereto. A large washer 64 is carried by the pin 63 above the diaphragm 54 and is clamped against the diaphragm 54 by means of a nut 65 threaded on the upper part of the pin 63.

The valve member 62 is normally retained in seated engagement on the valve seat 61 by means of a spring 66 which is disposed in the upper valve housing half 50 and which bears against the washer 64. The tension of the spring 66 is adjusted by means of an upper washer-like insert 67 which bears against the upper end of the spring 66. An adjusting pin 68 bears against the washer 67 to adjust the vertical position thereof. The adjusting pin 68 is externally threaded and is threadedly engaged in a bore 69 extending through an upper end of the valve housing half 50. A lock nut 70 is threaded on the upper end of the pin 68 to lock the pin 68 in an adjusted position. The upper end of the pin 68 is encased within a removable cap 71.

In the operation of the valve 33, fluid pressure transmission is through the lower housing half 52, normally being through the openings 56 and 57. However, when the pressure within the chamber 59 becomes sufficiently great to lift the diaphragm 54 against the downward urging of the spring 66, the valve member 62 will become unseated from the valve seat 61 and fluid pressure will also be transmitted down through the valve seat support 60 and out through the opening 58. The pressure at which the valve member 62 unseats from the valve seat 61 is controlled by adjusting the pin 68.

Although the accumulator 40 has been set forth in sufficient detail above for a general understanding of the operation thereof, further description of the accumulator 40 is made here. The aforementioned chamber 43 is defined by a housing, generally referred to by the numeral 72. The housing 72 includes an elongated sleeve 73 which is clamped between a pair of heads 74 and 75. The heads 74 and 75 are connected together and retained in clamped engagement with the ends of the sleeve 73 by means of elongated tie bolts 76 which pass through the heads 74 and 75. The heads 74 and 75 are connected in any suitable manner to supports diagrammatically illustrated and referred to by the numeral 77.

The bellows 42 has an end structure 78 which is suitably secured to the head 74 by means of a fastener 79 so as to prevent relative movement of the end structure 78 with respect to the head 74. A fitting 80 is threaded into the end structure 78 and the line 39 is coupled to the fitting 80.

The opposite end of the bellows 42 includes an end structure 81 which has a pin 82 extending axially therefrom. The spring 44 is telescoped over the pin 82 and bears against the end structure 81.

The aforementioned screw means 45 includes an elongated externally threaded tubular member 83 which is threaded through a bore 84 in the head 75. The sleeve 83 has an internal shoulder 85 against which the end of the spring 44 remote from the end structure 81 bears. The extreme end of the sleeve 83 is in the form of a nut portion 86 to facilitate the turning of the sleeve 83. A lock nut 87 is provided to secure the sleeve 83 in an adjusted position.

At this time, it is pointed out that the cross-section of the metering pin 19 varies in accordance with the shape of the cam 28 in a manner that the normal rate of movement effected by the oscillation of the cam 28 will result in only that fluid flow that may be accommodated by the orifice 20, as restricted by the metering pin 19, so that there is no excessive build up of pressure within the cylinder 17 during the normal movement of the housing member 7. It is pointed out that as the cross-section of the metering pin 19 increases, the normal reciprocatory speed of the piston 18 decreases so that notwithstanding the fact that the cross-section of the metering pin 19 varies, there is no problem of fluid transfer through the orifice 20. It is only when the rate of movement of the cam 28 is abnormal for a particular rotational position of the cam 28 that there is any problem of fluid flow through the orifice 20 which would result in excessive pressure build-up within the cylinder 17.

The operation of the braking system is as follows: When the speed of the housing member 7 in relationship to the gimbal 5 is below the predetermined speed limit for the particular point through which the housing 7 is moving, the system is in a state of equilibrium. In this state, no braking pressure is developed in the brake 11 and consequently the motion of the housing member 7 is not slowed down through the action of gears 8 and 9 and shaft 10. This safe speed operation of the housing 7 causes the piston rod 21 through the action of the cam 28 and cam follower 24 to be forced into the primary head end of the cylinder 17 at a moderate rate at which the fluid within the cylinder 17 can be displaced from the primary head end 26 into the secondary head end 27 without application of excessive pressure through line 30 to the extent necessary to open valve 33. Thus, in this state, no actuation fluid pressure is transmitted to the brake 11. Thus it is apparent that movements of the housing 7 below its prescribed speed limits will cause only normal minimum pressures to be set up within the closed and filled fluid system. Obviously, no actuation fluid pressure is transmitted into the expander tube 15 from the head end 26 when the housing 7 is stationary.

A minimum pressure is transmitted through lines 37 and 39 into the accumulator 40 which, although used primarily to absorb the volume increase due to the in-and-out movement of the piston rod 21 in relationship to the cylinder also supplies a simple means of adjusting the air gap in the brake 11 to zero. This is accomplished by adjusting the spring 44 by means 45 when the system is in a quiescent state (when housing 7 is stationary) so as to allow the bellows 42 to apply a slight pressure to the expander tube 15 through lines 39, 47', 41 and 32. This is important in that any flow of fluid between the brake and primary head end 26 is highly undesirable resulting in improper pressure conditions in the primary head end 26 during braking. When no initial air gap exists in the brake between the friction pad 14 and the outer shell 12 substantially no fluid flow will occur in lines 30, 31 and 32 during operation of the brake; only pressure being transmitted through these lines. In this way, then, the slightest actuation fluid pressure from the primary head end 26 will be immediately utilizable as braking force and will not have to initially absorb an air gap. The accumulator 40 also provides a simple means for detecting if the fluid system is full at times by means of the pressure switch 38.

When and if the housing member 7 reaches speeds that are above its predetermined speed limit for any particular point along its prescribed path, the system operates as follows: The rotational movement of the shaft 6 through cam 28 and cam follower 24 will force the piston rod 21 and its attached piston 18 further into the primary head end of the cylinder at such a rate that the fluid within the primary head end 26, only to a minor extent, is permitted to be displaced into the secondary pressure head 27. It should be noted, of course, that the decreasing orifice area available as the piston 18 is further displaced into the primary head end 26 assures that more complete control over the speed of the housing member 7 as it approaches its gimbal 5 is present in that more actuation fluid pressure is available to the brake 11 when less and less fluid can be transmitted through the orifice 20 into the secondary head end 27. When the fluid within the primary head end 26 reaches a predetermined pressure, valve 33 opens and fluid pressure is transmitted through lines 30, 31 and 32 so as to immediately actuate the brake 11 by means of the expansion tube 15. Subsequently, shaft 10 is braked and pinion gear 9 interferes with the normal driven speed of shaft 6 through the bull gear 8. In this way, then, the speed of the housing 7 is maintained within safe limits.

When the pressure within the primary head end 26 of the cylinder 16 decreases below the pressure needed to operate the valve 33 by the return of the housing member 7 to a safe speed, the pressure built up in the lines 31 and 32 is allowed to bleed off through the check valve 36 resulting in de-energizing of the brake 11.

The placement of the valve 46 is such so as to provide a pressure relief valve which is used to bypass excessive fluid pressures not needed in the actuation of brake 11 and thus provides an over-all safety for the system.

In order to effect the return of the piston 18 in accordance with the return oscillatory movement of the cam 28, a spring is mounted within the cylinder 17 and bears against the surface of the piston 18 remote from the piston pin 21. The spring, which is referred to by the numeral 88, is compressed when the piston 18 is moved upwardly, as viewed in FIGURE 3, and serves to force the piston 18 downwardly as the cam 28 recedes from beneath the cam follower 24.

It is thus apparent that there has been herein disclosed a functionally convenient and operational emergency braking system which operates only when a prescribed velocity speed limit of a housing member is exceeded. The braking system thus assures that a first member moving in relationship to a second member will not collide with that second member and thus protects both members from damage.

It is to also be understood that when velocity speed limit is mentioned that the velocity not to be exceeded may be infinitely small such as occurs when the housing 7 approaches one of its extreme positions just before halting.

It is to be further understood that in the disclosed embodiment of the invention when the housing 7 is in either extreme position of FIGURE 1 and moving from this position toward neutral, there will be no braking action occurring on the housing regardless of any overspeed until after it has passed the center or neutral position. Upon passing the neutral position, even if it is completely out of control of its drive system, the housing will immediately be braked down to a safe speed and its speed will continue to be reduced at a predetermined rate until it comes to a complete halt at a position only slightly beyond where it would normally stop when under control of its drive system.

Although the invention has been described in connection with an oscillating machine member, it is equally effective for use in preventing a member rotating constantly in one direction from exceeding a prescribed speed limit therefore, it is obvious that the specific embodiment and its structural details as herein described are not restrictive and that the invention may be practiced within the scope of the appended claims.

What is claimed as new:

1. A hydraulically operated braking system for restricting the speed of a body when the body moves above a predetermined rate, said system comprising a hydraulically actuated brake adapted to reduce the speed of the moving body, a pressure developer, a fluid line operatively connecting together said brake and said pressure developer and actuation means associated with said pressure developer and said body for controlling the operation of said pressure developer in accordance with the movement of the body whereby movements of the body at a speed greater than said predetermined rate cause said pressure developer to apply a fluid force upon said brake so as to reduce the speed of the moving body, the pressure developer including a hydraulic cylinder, a metering pin axially mounted therein, an orificed piston movable within said cylinder, and said pin being aligned with and passing through the orifice whereby the effective area of said orifice varies according to the relative position of the piston within the cylinder.

2. A hydraulically operated braking system for restricting the speed of a moving body above a predetermined rate, which body is adapted for oscillatory movement about a shaft to which the body is fixed within prescribed arcuate limits, said system comprising a hydraulically operated brake adapted to reduce the speed of the moving body, a pressure developer, a fluid line operatively connecting said brake to said pressure developer, and actuation means associated with said pressure developer and the body for controlling the operation of the pressure developer in accordance with the movement of the body whereby the movement of the body at rates greater than said predetermined rate causes said pressure developer to apply a fluid force upon the brake so as to reduce the speed of the moving body, the pressure developer including a hydraulic cylinder, a metering pin axially mounted therein, an orificed piston positioned in said cylinder, means for moving the piston axially in said cylinder, said metering pin being aligned with and passing through the orifice whereby the effective area of the orifice varies with the position of the piston within the cylinder, and said actuation means including a cam mounted on the shaft and a cam follower attached to the means for moving the piston relative to the cylinder.

3. A hydraulically operated braking system for restricting the speed of a moving body above a predetermined rate, which body is adapted for movement along a prescribed path, said system comprising a hydraulically operated brake adapted to reduce the speed of the moving body, a pressure developer including a hydraulic cylinder, an orificed piston positioned therein, a metering pin mounted in said cylinder and passing through the piston orifice, said piston dividing the cylinder into a first zone and a second zone and means responsive to the movement of said body for moving said piston relative to the cylinder and the metering pin to vary the effective opening of the orifice, a fluid line running from said first zone to said brake, pressure valve means in said line, a fluid return line by-passing said pressure valve means and a check valve in said return line, whereby the movement of said body at a speed greater than said predetermined speed actuates the braking system so as to reduce the speed of the moving body.

4. A hydraulically operated braking system for restricting the speed of a moving body above a predetermined rate, which body is adapted for movement along a prescribed path, said system comprising a hydraulically operated brake adapted to reduce the speed of the moving body, a pressure developer including a hydraulic cylinder, an orificed piston positioned therein, a metering pin mounted in said cylinder and passing through the piston orifice, said piston dividing the cylinder into a first zone and a second zone and means responsive to the movement of said body for moving said piston relative to the cylinder and the metering pin to vary the effective opening of the orifice, a fluid line running from said first zone to said brake, pressure valve means in said line, whereby the movement of said body at a speed greater than said predetermined speed actuates the braking system so as to reduce the speed of the moving body.

5. A hydraulically operated braking system for restricting the speed of a body when the body moves above a predetermined rate, said system comprising a hydraulically actuated brake adapted to reduce the speed of the moving body, a pressure developer, fluid conduit means operatively connecting together said brake and said pressure developer and actuation means associated with said pressure developer and said body for controlling the operation of said pressure developer in accordance with the movement of the body whereby movements of the body at a speed greater than said predetermined rate cause said pressure developer to apply a fluid force upon said brake so as to reduce the speed of the moving body, said pressure developer including a closed cylinder, a piston mounted within said cylinder for reciprocation and dividing said cylinder into first and second sections, hydraulic fluid filling said cylinder, an orifice through said piston placing said cylinder sections in communication and permitting fluid flow through said piston whereby there is a transfer of fluid between said cylinder sections during movement of said piston, and a fixed metering pin mounted in said first cylinder section and extending through said orifice for varying the cross section of said orifice in accordance with the position of said piston and thus varying the capability of said orifice to pass fluid through said piston, said metering pin having a cross section varying in accordance with the normal travel rate of said piston under normal operating conditions of said body whereby the effective cross section of said orifice is constantly that required to pass fluid pumped by said piston.

6. The braking system of claim 5 wherein said body oscillates and said actuation means includes a cam for effecting the reciprocation of said piston, said cam having a contour for producing a maximum piston stroke for a minimum angular change in position at the time of minimum rate of movement of said body whereby the rate of movement of said piston is more nearly constant.

7. The braking system of claim 5 wherein said actuating means includes a piston rod connected to said piston, said system is a closed system, and said fluid conduit means includes a hydraulic fluid accumulator for temporarily receiving and storing fluid displaced by said piston rod.

8. A hydraulically operated braking system for restricting the speed of a body when the body moves above a predetermined rate, said system comprising a hydraulically actuated brake adapted to reduce the speed of the moving body, a pressure developer, fluid conduit means operatively connecting together said brake and said pressure developer and actuation means associated with said pressure developer and said body for controlling the operation of said pressure developer in accordance with the movement of the body whereby movements of the body at a speed greater than said predetermined rate cause said pressure developer to apply a fluid force upon said brake so as to reduce the speed of the moving body, said pressure developer including a closed cylinder and a piston mounted within said cylinder for reciprocation, said piston having an orifice formed therethrough, a tapered metering pin mounted in said cylinder and being disposed in said orifice whereby the effective area of said orifice varies according to the relative position of the piston within the cylinder, hydraulic fluid filling said cylinder, said actuation means including a piston rod connected to said piston, said system being a closed system, and said fluid conduit means including a hydraulic fluid accumulator for receiving and storing fluid, said actuating means associated with said pressure developer including means for continually increasing the effectiveness of said brake.

9. The braking system of claim 8 wherein said accumulator is of an adjustable capacity whereby adjustment of said brake may be accomplished by adjusting said accumulator.

10. The braking system of claim 5 wherein said fluid conduit means includes a fluid line extending between said cylinder sections, first and second check valves mounted in said fluid line for restricting fluid flow from said first cylinder section to said second cylinder section, a brake line connected to said fluid line intermediate said check valves, a pressure operable valve in said fluid line intermediate said cylinder and said first check valve, and a by-pass line from said pressure operable valve around said first check valve and connected to said fluid line intermediate said check valves for supplying fluid pressure to said brake line to actuate said brake when a predetermined pressure is produced in said first cylinder section.

11. The braking system of claim 5 wherein said fluid conduit means includes a fluid line extending between said cylinder sections, first and second check valves mounted in said fluid line for restricting fluid flow from said first cylinder section to said second cylinder section, a brake line connected to said fluid line intermediate said check valves, a pressure operable valve in said fluid line intermediate said cylinder and said first check valve, a by-pass line from said pressure operable valve around said first check valve and connected to said fluid line intermediate said check valves for supplying fluid pressure to said brake line to actuate said brake when a predetermined pressure is produced in said first cylinder section, a pressure relief valve in said fluid line intermediate said brake line and said second check valve, and a second by-pass line around said second check valve between said pressure relief valve and said fluid line.

12. A pump comprising a cylinder having a head end and a rod end, a piston disposed within and dividing said cylinder into first and second chambers, said piston having an orifice formed therein for allowing communication of fluid between said first and second chambers, a piston rod centrally attached to said piston and extending outwardly of the rod end of said cylinder, a cam follower on said piston rod, a metering pin affixed in one of said chambers and passing through said orifice to vary the effective area thereof, said metering pin being offset from said piston rod and thereby preventing rotation of said piston within said cylinder.

13. A device as defined in claim 12 in which said cam follower comprises a roller, and means pivotally connecting said roller to said piston rod, said roller being maintained in predetermined alignment with said cylinder because of the non-rotation of said piston due to the cooperation between the piston and said metering pin.

References Cited by the Examiner

UNITED STATES PATENTS

| 913,349 | 2/09 | Batault et al. | 188—88.509 |
|---|---|---|---|
| 2,843,228 | 7/58 | Wyson | 188—86 |
| 2,969,856 | 1/61 | Dow | 188—110 |
| 3,083,693 | 4/63 | Kunz | 137—625.46 |

FOREIGN PATENTS

| 274,388 | 7/27 | Great Britain. |
|---|---|---|

EUGENE G. BOTZ, *Primary Examiner.*

ARTHUR L. LA POINT, *Examiner.*